UNITED STATES PATENT OFFICE.

JAMES BAKER, OF NEW YORK, N. Y.

IMPROVEMENT IN THE MANUFACTURE OF ANTIQUE-COLORED GLASS.

Specification forming part of Letters Patent No. 171,971, dated January 11, 1876; application filed December 11, 1875.

*To all whom it may concern:*

Be it known that I, JAMES BAKER, of the city, county, and State of New York, have invented a new and Improved Method of Producing Antique-Colored Glass for Church-Windows, &c., of which the following is a specification:

The object of my invention is to provide a method by which colored glass for ornamental purposes for church and other windows may be furnished, and the same degree of brilliancy and semi-translucency obtained, as is found in the stained-glass windows of the medieval cathedrals and churches.

The invention consists in taking fused glass on the rod, and produce, by turning the same simultaneously with blowing through the rod, a glass plate of disk or oval shape of the required size, which is to be cut into smaller pieces for use.

The stained glass hitherto employed is rolled, and has an even color throughout, which imparts to the pictures or ornaments made therewith a too regular and monotonous appearance, without variety and life in the same.

By my method of turning or "spinning" the fused glass of any color or tint into disk or oval shape concentric streaks are formed around the bull's-eye at the issuing-orifice of the rod, while at the same time different shades are formed by the slightly-diminishing thickness of the glass disk from the center toward the circumference. This admits of bringing a certain shading into the glass pieces employed, which increases the effect of the same to a large extent.

The peculiar concentric structure of the glass disk obtained by simultaneously blowing through the rod and turning the same in one direction produces a brilliant sparkle and semi-translucent effect which approaches the warm and effective coloring of antique glass, and furnishes thereby colored glass of superior quality for church-windows and other ornamental purposes.

Having thus described my invention, I claim as new and desire to secure by Letters Patent—

1. The method herein described of producing antique-colored glass for church and other windows, consisting in spinning the fused and colored glass into flat disk or oval shape by turning the rod simultaneously with blowing through the same, substantially in the manner and for the purpose set forth.

2. As a new article of manufacture, colored glass having concentric streaks, with a slight shading from the inner toward the outer streaks, substantially as set forth.

JAMES BAKER.

Witnesses:
PAUL GOEPEL,
T. B. MOSHER.